United States Patent
Yamashita et al.

(10) Patent No.: US 11,299,110 B2
(45) Date of Patent: Apr. 12, 2022

(54) ACOUSTIC INSULATION STRUCTURE FOR POWER TRAIN

(71) Applicant: TOYOTA JIDOSHA KABUSHIKI KAISHA, Toyota (JP)

(72) Inventors: Yoshiya Yamashita, Toyota (JP); Masaya Tagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 752 days.

(21) Appl. No.: 16/253,625

(22) Filed: Jan. 22, 2019

(65) Prior Publication Data

US 2019/0275962 A1 Sep. 12, 2019

(51) Int. Cl.
| | |
|---|---|
| *B60R 13/07* | (2006.01) |
| *B60R 13/08* | (2006.01) |
| *F02B 77/13* | (2006.01) |
| *F01P 11/12* | (2006.01) |
| *F01P 11/10* | (2006.01) |

(52) U.S. Cl.
CPC .......... *B60R 13/07* (2013.01); *B60R 13/0838* (2013.01); *F01P 11/12* (2013.01); *F02B 77/13* (2013.01); *F01P 11/10* (2013.01)

(58) Field of Classification Search
CPC ...... B60R 13/07; B60R 13/0838; F01P 11/12; F01P 11/10; F01P 1/00; F01P 11/00; F01P 2001/005; F02B 77/13
See application file for complete search history.

(56) References Cited

U.S. PATENT DOCUMENTS

| | | | |
|---|---|---|---|
| 4,753,318 A | 6/1988 | Mizuno et al. | |
| 4,854,278 A | 8/1989 | Honecker | |

FOREIGN PATENT DOCUMENTS

| | | |
|---|---|---|
| DE | 19534972 A1 | 3/1997 |
| EP | 0191012 A1 | 8/1986 |
| JP | H07-8168 U | 2/1995 |
| JP | H07-280198 A | 10/1995 |
| JP | 2012-026946 A | 2/2012 |
| JP | 2017-013638 A | 1/2017 |

*Primary Examiner* — Jacob M Amick
*Assistant Examiner* — Charles J Brauch
(74) *Attorney, Agent, or Firm* — Oliff PLC

(57) ABSTRACT

An acoustic insulation structure for a power train according to the present disclosure is provided with a cover member that covers at least an internal combustion engine of the power train including the internal combustion engine, and that includes a pool portion in which water that has entered into the inside of the cover member pools; and a water-absorption member arranged at the inside of the cover member. The cover member includes a moisture outlet that releases, into the atmospheric air, moisture present inside the cover member. The water-absorption member extends to the moisture outlet from the pool portion.

9 Claims, 4 Drawing Sheets

ACOUSTIC INSULATION STRUCTURE FOR POWER TRAIN

CROSS-REFERENCE TO RELATED APPLICATION

This application is based on and claims the benefit of Japanese Patent Application No. 2018-042125, filed on Mar. 8, 2018, which is incorporated by reference herein in its entirety.

BACKGROUND

Technical Field

The present disclosure relates to an acoustic insulation structure for a power train, and more particularly to an acoustic insulation structure that is applied to at least an internal combustion engine of a power train including the internal combustion engine.

Background Art

For example, JP 2017-013638 A discloses a cooling structure for an engine compartment. This cooling structure is provided with a heat retention cover that covers the periphery of an internal combustion engine arranged in the engine compartment.

More specifically, an inlet and outlet of cooling wind are each formed in the heat retention cover. In addition, an inlet opening/closing portion for adjusting the intake amount of the cooling wind is provided at a formation portion of the inlet, and an outlet opening/closing portion for adjusting the discharge amount of the cooling wind is provided at a formation portion of the outlet.

SUMMARY

According to the cooling structure for the engine compartment disclosed in JP 2017-013638 A, there is a possibility that water may enter into the inside of the heat retention cover from the inlet of the cooling wind, and that the water that has been entered may pool in a bottom surface portion of the heat retention cover. However, J P 2017-013638 A does not disclose any countermeasure against the water that may enter into the inside of the heat retention cover in this way. Thus, the cooling structure disclosed in JP 2017-013638 A still has room for improvement in terms of facilitating discharging the water that has entered into the inside of the heat retention cover.

The present disclosure has been made to address the problem described above, and an object of the present disclosure is to provide an acoustic insulation structure for a power train that can effectively discharge water that has entered into the inside of a cover member that covers an internal combustion engine.

An acoustic insulation structure for a power train according to the present disclosure includes: a cover member that covers at least an internal combustion engine of the power train including the internal combustion engine, and that includes a pool portion in which water that has entered into an inside of the cover member pools; and a water-absorption member arranged at the inside of the cover member. The cover member includes a moisture outlet that releases, into an atmospheric air, moisture present inside the cover member. The water-absorption member extends to the moisture outlet from the pool portion.

The moisture outlet may be arranged at a location opposed to a high-temperature portion of the internal combustion engine or a vehicle on which the power train is mounted.

The high-temperature portion may be an exhaust system part of the internal combustion engine.

The high-temperature portion may be a radiator through which coolant that cools the internal combustion engine flows.

The cover member may cover a lower portion of the internal combustion engine including a bottom portion of the internal combustion engine. The pool portion may be arranged at a location opposed to the bottom portion.

The acoustic insulation structure may further include an oil detection sheet that is attached to the water-absorption member at a location at which oil drops from the internal combustion engine, and that does not change color even if the oil detection sheet comes contact with moisture and changes color in response to attachment of the oil.

The power train may include a transmission combined with the internal combustion engine. The cover member may cover the transmission in addition to the internal combustion engine. The acoustic insulation structure may further include an oil detection sheet that is attached to the water-absorption member at a location at which oil drops from the transmission, and that does not change color even if the oil detection sheet comes contact with moisture and changes color in response to attachment of the oil.

The acoustic insulation structure may further include a fuel detection sheet that is attached to the water-absorption member at a location at which fuel drops from the internal combustion engine, and that does not change color even if the oil detection sheet comes contact with moisture and changes color in response to attachment of the fuel.

The acoustic insulation structure may further include a coolant detection sheet that is attached to the water-absorption member at a location at which coolant that cools the internal combustion engine drops from the internal combustion engine, and that does not change color even if the oil detection sheet comes contact with moisture and changes color in response to attachment of the coolant.

According to the acoustic insulation structure for a power train of the present disclosure, the water that has entered into the inside of the cover member pools in the pool portion and is absorbed by the water-absorption member. Since the water-absorption member extends to the moisture outlet, the moisture absorbed by the water-absorption member becomes easy to be evaporated from the water-absorption member at a portion located near the moisture outlet that communicates with the atmospheric air. As a result of this, the water that has pooled in the pool portion flows in such a way as to be sucked out through the water-absorption member toward a portion that is located near the moisture outlet and that is easy to be dehydrated (i.e., transpiration effect). Then, the moisture that has flown to the vicinity of the moisture outlet through the water-absorption member is sequentially evaporated and released into the atmospheric air. As just described, according to the acoustic insulation structure of the present disclosure, even if the water pools in the pool portion, the water that has entered into the inside of the cover member can be effectively discharged.

DETAILED DESCRIPTION

Figure 1:
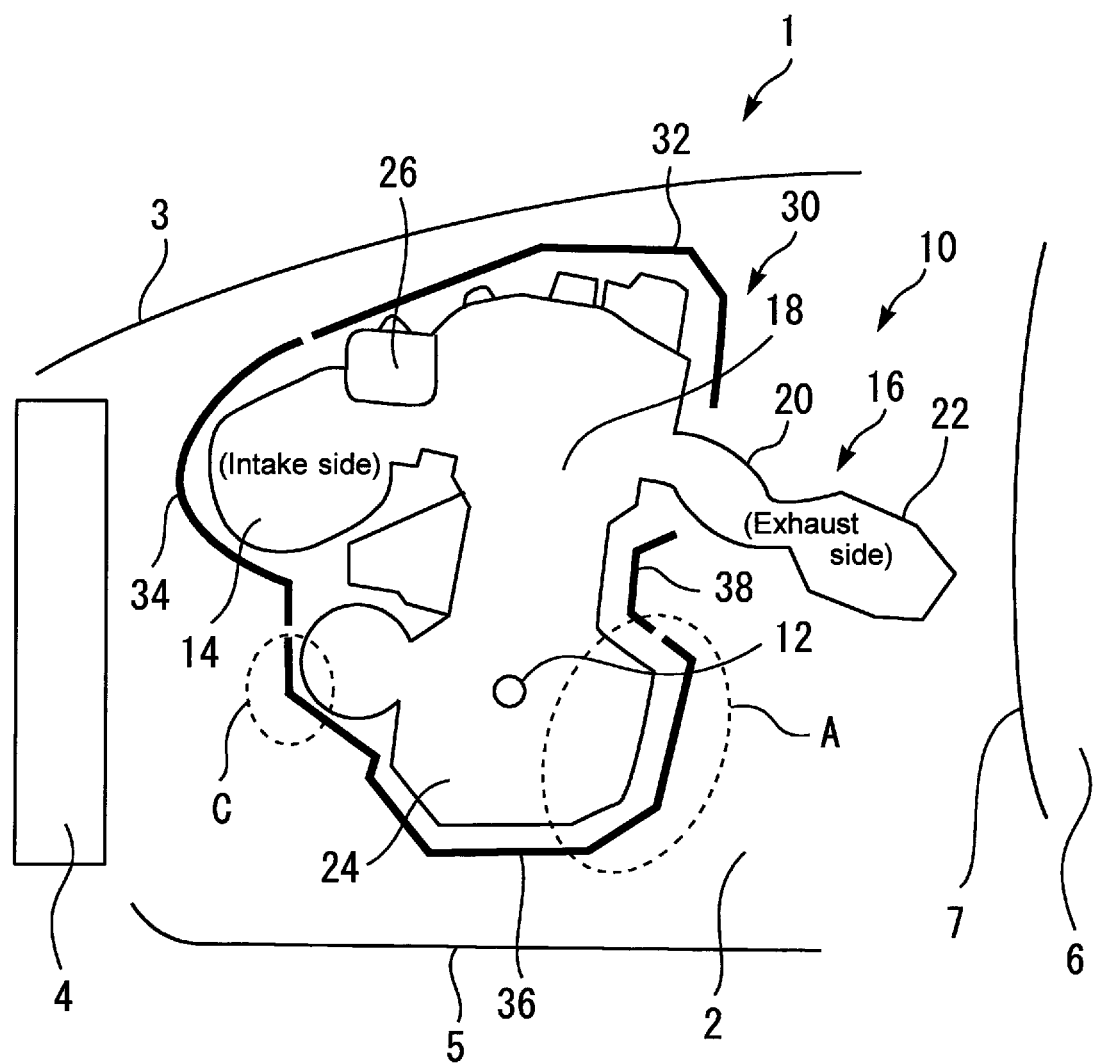
FIG. 1 is a diagram (a vehicle side view) that schematically illustrates the configuration of an internal combustion engine to which an acoustic insulation structure for a power train according to a first embodiment of the present disclosure is applied and around the internal combustion engine.

In embodiments of the present disclosure which will be described later, elements that are the same as each other in the drawings are denoted by the same reference symbols, and redundant descriptions of those elements will be omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

1. First Embodiment

Firstly, a first embodiment according to the present disclosure will be described with reference to FIGS. 1 to 4.

1-1. Configuration of Internal Combustion Engine and Therearound

FIG. 1 is a diagram (a vehicle side view) that schematically illustrates the configuration of an internal combustion engine 10 to which an acoustic insulation structure for a power train according to the first embodiment of the present disclosure is applied and around the internal combustion engine 10. The power train of a vehicle 1 shown in FIG. 1 includes the internal combustion engine 10 (illustration of parts other than the internal combustion engine 10 is omitted). The internal combustion engine 10 is installed in an engine compartment 2 of the vehicle 1.

In FIG. 1, the left side of the sheet corresponds to the front side of the vehicle 1, and the upper side of the sheet corresponds to the upper side of the vehicle 1. An engine hood 3 is arranged at the vehicle upper side of the internal combustion engine 10. A radiator 4 is arranged at the vehicle front side of the internal combustion engine 10. Inside the radiator 4, a coolant that cools the internal combustion engine 10 flows. In addition, an engine lower cover 5 is arranged at the vehicle lower side of the internal combustion engine 10, and a bulkhead 7 (such as, cowl top panel and dash panel) that separates the engine compartment 2 from a vehicle interior 6 is arranged at the vehicle rear side. It should be noted that vehicle components (not shown), such as a suspension tower, is arranged at the vehicle-left-and-right side of the internal combustion engine 10.

In the example shown in FIG. 1, the internal combustion engine 10 is mounted on the vehicle 1 such that the axial direction of a crankshaft 12 coincides with the left-right direction of the vehicle 1. Also, in the example shown in FIG. 1, the internal combustion engine 10 is mounted on the vehicle 1 such that intake system parts 14 are located on the vehicle front side and exhaust system parts 16 are located on the vehicle rear side. The exhaust system parts 16 include an exhaust pipe 20 through which a high-temperature exhaust gas that is discharged from each cylinder of an engine main body 18 flows and an exhaust gas purifying catalyst 22.

Moreover, the internal combustion engine 10 is equipped with an oil pan 24 located at the bottom portion thereof. In the oil pan 24, an oil that lubricates the interior of the internal combustion engine 10 is stored. Furthermore, the internal combustion engine 10 is equipped with a fuel injection device 26.

1-2. Acoustic Insulation Structure

The acoustic insulation structure for the power train according to the present embodiment is applied to only the internal combustion engine 10, as an example. This acoustic insulation structure is provided with an acoustic insulation cover 30 that covers the internal combustion engine 10. In the example shown in FIG. 1, the acoustic insulation cover 30 is divided into four acoustic insulation covers 32, 34, 36 and 38. That is to say, this set of the acoustic insulation covers 32, 34, 36 and 38 is collectively called the acoustic insulation cover 30. It should be noted that, although the manner of attachment of the acoustic insulation cover 30 to the internal combustion engine 10 is not particularly limited, the acoustic insulation cover 30 is attached to the internal combustion engine 10, as an example, using a fastener (such as bolts) which are not shown.

As shown in FIG. 1, the acoustic insulation cover 32 mainly covers an upper portion (including the fuel injection device 26) of the internal combustion engine 10. The acoustic insulation cover 34 covers a portion of the internal combustion engine 10 located on the center in the top-bottom direction of the vehicle 1 and on the vehicle front side (including the intake system parts 14). The acoustic insulation cover 36 covers a lower portion of the internal combustion engine 10 including a bottom portion (i.e., oil pan 24) of the internal combustion engine 10. Moreover, the acoustic insulation cover 38 covers a portion of the internal combustion engine 10 located on the center in the top-bottom direction of the vehicle 1 and on the vehicle rear side (i.e., exhaust side).

In addition, it is supposed that, with regard to the left-right direction of the vehicle 1, each of the acoustic insulation covers 32 to 38 is formed, for example, so as to extend to the whole width of the internal combustion engine 10 in the left-right direction. Furthermore, an upper portion, a middle portion and a lower portion of a side-end surface located on the vehicle right side of the internal combustion engine 10 may be respectively covered by the acoustic insulation covers 32, 34 and 36 or may be covered by another acoustic insulation cover having a similar configuration thereto. This also applies to a portion of a side-end portion located on the vehicle left side of the internal combustion engine 10 (more specifically, a portion other than a fastening portion between the internal combustion engine 10 and a transmission (see FIG. 7)).

The acoustic insulation structure according to the present embodiment has characteristics mainly in the configuration of the acoustic insulation cover 36 that covers the lower portion of the internal combustion engine 10. Hereunder, a detailed configuration of the acoustic insulation cover 36 will be described with reference to FIGS. 2 to 4.

Figure 2:
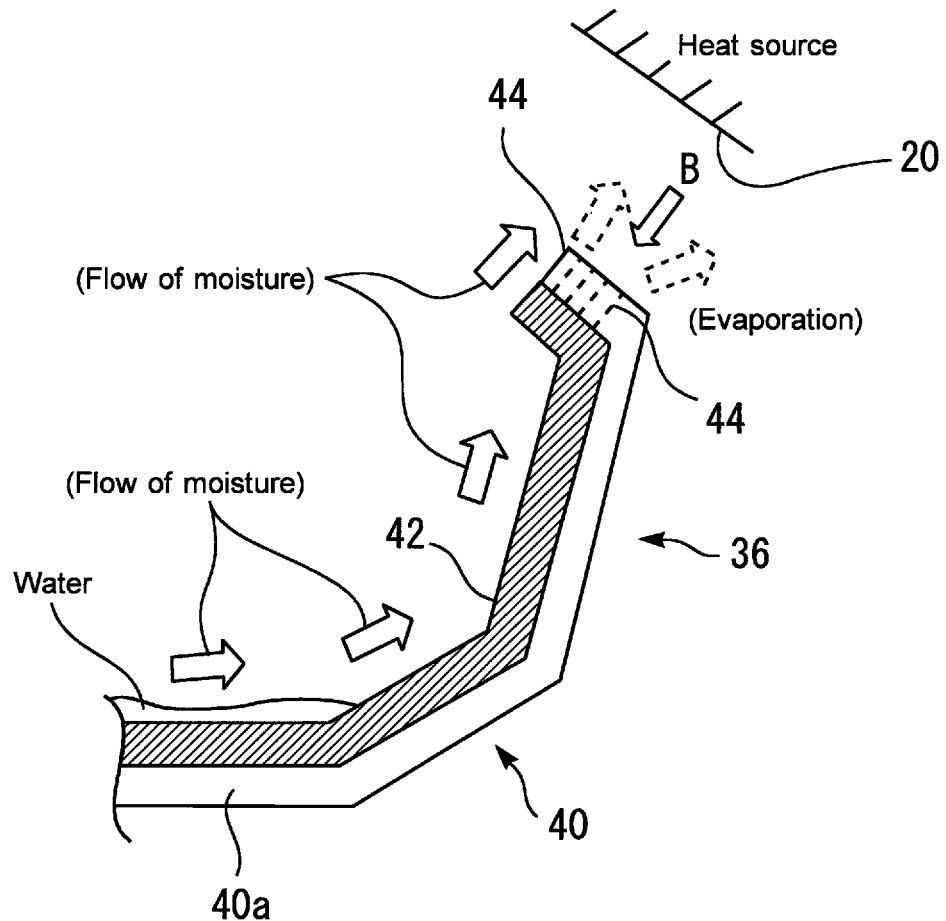
FIG. 2 is an enlarged cross-sectional view that illustrates a portion A of an acoustic insulation cover shown in FIG. 1 located on the exhaust side.

1-2-1. Configuration of Portion A of Acoustic Insulation Cover 36 Located on Exhaust Side FIG. 2 is an enlarged cross-sectional view that illustrates a portion A of the acoustic insulation cover 36 shown in FIG. 1 located on the exhaust side. As shown in FIG. 2, the acoustic insulation cover 36 is configured by a cover member 40 and an water-absorption member 42.

In detail, the cover member 40 corresponds to a portion of the acoustic insulation cover 36 located on the outside (i.e., the side of the engine compartment 2). The cover member 40 is configured by a material having a high acoustic absorption performance. Moreover, as the material of the cover member 40, a material having a certain level of stiffness is used. An example of this kind of material of the cover member 40 is a fibrous material made of PET (Polyethylene terephthalate) fiber. Furthermore, the surface of the cover member 40 is subjected to water-repellent treatment. Thus, the cover member 40 has a high water-repellent property in addition to a high acoustic absorption performance.

On the other hand, the water-absorption member 42 corresponds to a portion of the acoustic insulation cover 36 located on the inside thereof (i.e., the side of the internal combustion engine 10). The water-absorption member 42 is configured by a material having a high water-absorbing performance. Moreover, as the material of the water-absorption member 42, a material that is softer than that of the cover member 40 is used. An example of this kind of material of the water-absorption member 42 is unwoven fabric. The water-absorption member 42 is attached to the cover member 40 by the use of an adhesive agent, for example. The water-absorption member 42 may alternatively be attached to the cover member 40 by the use of, for example, a thermal compression bonding (such as, hot pressing), instead of the adhesive agent.

Additionally, the acoustic insulation cover 36 has a double structure with the cover member 40 and the water-absorption member 42 that are described above. It should be noted that, in the example shown in FIG. 1, each of other acoustic insulation covers 32, 34 and 38 is supposed to be configured only by a cover member having the same material as that of the cover member 40 (i.e., each of them is not accompanied by a water-repellent member).

The cover member 40 is further provided with a moisture outlet 44. The moisture outlet 44 is provided to release, into the atmospheric air (that is, in the engine compartment 2), the water that has entered into the inside of the cover member 40. In detail, the moisture outlet 44 is arranged at an upper end (i.e., open end) of the cover member 40 located on the exhaust side (i.e., vehicle rear side) and is opposed to the exhaust pipe 20. In addition, the moisture outlet 44 is provided at a location that is higher than a pool portion (i.e., bottom surface portion 40a) in the top-bottom direction of the vehicle 1.

The bottom surface portion 40a of the cover member 40 corresponds to an example of the "pool portion" according to the present disclosure in which, when water that has entered into the inside of the acoustic insulation cover 36, the water pools. As shown in FIG. 2, the water-absorption member 42 extends from the bottom surface portion 40a (i.e., pool portion) of the cover member 40 to the moisture outlet 44. In addition, in the example shown in FIG. 2, the pool portion that is the bottom surface portion 40a is opposed to the bottom portion (i.e., oil pan 24) of the internal combustion engine 10.

As described above, a high-temperature exhaust gas flows inside the exhaust pipe 20. As a result, the exhaust pipe 20 and the exhaust system parts 16 therearound are easy to become high in temperature as compared to other portions. Because of this, the moisture outlet 44 that is opposed to the exhaust pipe 20 at a location closer to the exhaust pipe 20 receives heat from the exhaust pipe 20. Thus, the exhaust pipe 20 serves as a heat source of the moisture outlet 44. It should be noted that the exhaust pipe 20 corresponds to an example of the "high-temperature portion of the internal combustion engine" according to the present disclosure.

Figure 3:
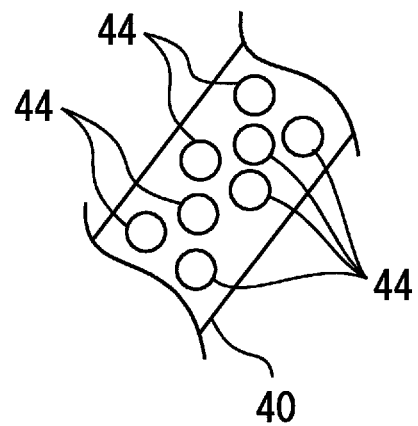
FIG. 3 is a schematic view of a moisture outlet viewed from the direction of an arrow B in FIG. 2.

FIG. 3 is a schematic view of the moisture outlet 44 viewed from the direction of an arrow B in FIG. 2. As shown in FIG. 3, the moisture outlet 44 is an opening that causes the water-absorption member 42 to communicate with the atmospheric air (i.e., the air in the engine compartment 2). The moisture outlet 44 is configured by a plurality of holes having a circular cross-section, as an example.

Figure 4:
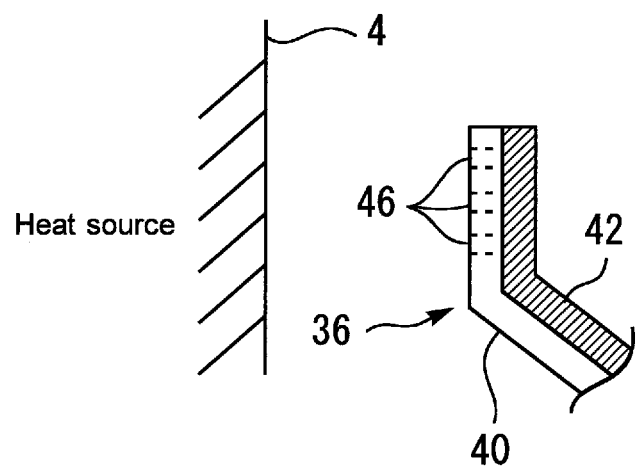
FIG. 4 is an enlarged cross-sectional view that illustrates a portion C of the acoustic insulation cover shown in FIG. 1 located on the intake side.

1-2-2. Configuration of Portion C of Acoustic Insulation Cover 36 Located on Intake Side FIG. 4 is an enlarged cross-sectional view that illustrates a portion C of the acoustic insulation cover 36 shown in FIG. 1 located on the intake side. As shown in FIG. 4, the cover member 40 is also provided, for the intake side (vehicle front side), with a moisture outlet 46 having a configuration similar to that of the moisture outlet 44. In detail, the moisture outlet 46 is arranged at an upper end (i.e., open end) of the cover member 40 located on the intake side and is opposed to the radiator 4. Although illustration of a part of the water-absorption member 42 is omitted, the water-absorption member 42 is extends from the bottom surface portion (i.e., pool portion) 40a (see FIG. 2) to the moisture outlet 46.

The radiator 4 releases heat of a cooling water that has increased in temperature as a result of heat being received from the internal combustion engine 10. As a result, the moisture outlet 46 that is opposed to the radiator 4 at a location closer to the radiator 4 receives heat from the radiator 4. Because of this, the radiator 4 also serves as a heat source of the moisture outlet 46. It should be noted that the radiator 4 corresponds to an example of the "high-temperature portion of the vehicle on which the power train is mounted" according to the present disclosure.

It should be noted that, in an example in which a lower portion of a side-end surface of the internal combustion engine 10 located on the vehicle-left-and-right side is covered by the acoustic insulation cover 36 or an acoustic insulation cover similar to this, the moisture outlet 44 or 46 may be similarly provided for a cover member 40 that is arranged at the side-end surface.

1-3. Advantageous Effects Concerning Acoustic Insulation Structure

Inside the acoustic insulation cover 30 (32 to 38), rainwater or water that is splashed by a tire of the vehicle 1 may be entered. In the acoustic insulation cover 36 having the pool portion (i.e., bottom surface portion 40a of the cover member 40), the water that has been entered pools in the pool portion (i.e., bottom surface portion 40a). If moisture pools inside the acoustic insulation cover 36 over a long period of time, there is a possibility that rust or corrosion may occur at a metal portion that is in contact with or adjacent to the acoustic insulation cover 36.

According to the acoustic insulation structure of the internal combustion engine 10 of the present embodiment described above, the water-absorption member 42 is arranged at the inside of the cover member 40 (i.e., the side of the internal combustion engine 10) of the acoustic insulation cover 36 that covers the lower portion of the internal combustion engine 10. The moisture outlets 44 and 46 are formed in the cover member 40. Also, the water-absorption member 42 extends from the pool portion (i.e., bottom surface portion 40a) to each of the moisture outlets 44 and 46.

Thus, according to the acoustic insulation structure of the present embodiment, the water that has entered into the inside of the cover member 40 pools in the bottom surface portion 40a (i.e., pool portion) and is absorbed by the water-absorption member 42 located on the inside of the cover member 40. The moisture absorbed by the water-absorption member 42 becomes easy to be evaporated from the water-absorption member 42 at a portion located near the moisture outlets 44 and 46 that communicate with the atmospheric air. As a result of this, as shown in FIG. 2, the water that has pooled in the bottom surface portion 40a (i.e., pool portion) flows in such a way as to be sucked out through the water-absorption member 42 toward a portion that is located near the moisture outlet 44 (similarly near the moisture outlet 46) and that is easy to be dehydrated (i.e., transpiration effect). Then, the moisture sucked out to the vicinity of each of the moisture outlets 44 and 46 is sequentially evaporated and released into the atmospheric air (i.e., in the engine compartment 2).

As described so far, according to the acoustic insulation structure of the present embodiment, the water that has entered into the inside of the cover member 40 that covers the internal combustion engine 10 can be effectively discharged. In addition, the acoustic insulation structure for the power train including the internal combustion engine 10 is required to be achieved in an extremely-limited space in the engine compartment 2. Because of this, an acoustic insulation cover (such as the acoustic insulation cover 30 of the present embodiment) may be configured with complicated surfaces along the shape of a component (such as an internal combustion engine), and it may be difficult to completely cover the entire component (such as an internal combustion engine). In this regard, according to the acoustic insulation structure of the present embodiment, even when it is difficult to completely cover the entire component (such as an internal combustion engine), the water that has entered into the inside of the cover member from a gap between the acoustic insulation covers can be effectively discharged.

Moreover, according to the acoustic insulation structure of the present embodiment, the moisture outlets 44 and 46 are arranged at the locations that are respectively opposed to the high-temperature portion (i.e., exhaust pipe 20) of the internal combustion engine 10 and the high-temperature portion (i.e., radiator 4) of the vehicle 1. These exhaust pipe 20 and radiator 4 each serve as heat sources that promote the evaporation of the water absorbed by the water-absorption member 42. That is to say, the moisture outlets 44 and 46 are arranged at the locations that are easy to be affected by heats from the heat sources. Because of this, the evaporation of the moisture in the portions of the water-absorption member 42 located in the vicinity of the moisture outlets 44 and 46 can be promoted by the use of these heats. Therefore, the discharge of the water by the transpiration effect described above can be performed more effectively.

Moreover, the moisture outlet 44 is arranged at the vehicle rear side with respect to the engine main body 18. Thus, the moisture outlet 44 can be provided at the location into which the water that has entered into the engine compartment 2 from the vehicle front side is difficult to enter. Furthermore, the moisture outlets 44 and 46 are arranged at the locations that are higher in the top-bottom direction of the vehicle 1 (i.e., locations that are higher as compared to at least bottom surface portion 40a). Thus, the moisture outlets 44 and 46 can be provided at the location into which the water that has entered into the engine compartment 2 from the vehicle lower side is difficult to enter. Although, broadly speaking, portions of installation of the moisture outlet according to the present disclosure are not particularly limited, the example of the portions of installation of the moisture outlets 44 and 46 is favorable in terms of reduction of entry of the water into the moisture outlet.

2. Second Embodiment

Next, a second embodiment according to the present disclosure and modification examples will be described with reference to FIGS. 5 to 7.

2-1. Acoustic Insulation Structure Provided with Oil Detection Sheet

Figure 5:
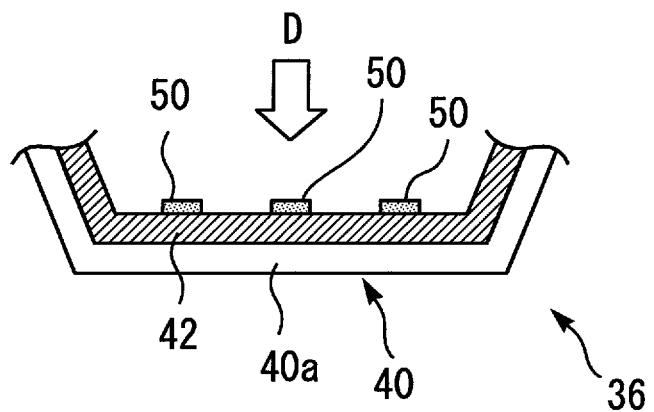
FIG. 5 is a schematic cross-sectional view for describing a characteristic portion of an acoustic insulation structure for a power train according to a second embodiment of the present disclosure.

FIG. 5 is a schematic cross-sectional view for describing a characteristic portion of the acoustic insulation structure for the power train according to the second embodiment of the present disclosure. FIG. 6 is a view of the water-absorption member 42 viewed from the direction of an arrow D in FIG. 5. The acoustic insulation structure according to the present embodiment is similar to the acoustic insulation structure according to the first embodiment except that it is additionally provided with an oil detection sheet 50.

According to the present embodiment, as shown in FIG. 5, a plurality of oil detection sheets 50 are installed in further inside the water-absorption member 42 located inside the bottom surface portion 40a (i.e., pool portion) of the cover member 40 of the acoustic insulation cover 36. As each of these oil detection sheets 50, for example, a known oil test paper that changes color in response to attachment of oil and does not change color even if it comes contact with moisture can be used.

As already described, the bottom surface portion 40a is opposed to the bottom portion of the internal combustion engine 10 (that is, a portion at which the oil pan 24 is arranged). Because of this, the oil (engine oil) is likely to drop from the internal combustion engine 10 to the bottom surface portion 40a. Thus, the plurality of oil detection sheets 50 are attached to the water-absorption member 42 at locations at which the oil may drop from the internal combustion engine 10. As an example, these oil detection sheets 50 are attached to the surface of the water-absorption member 42 by the use of adhesion, for example.

In addition, the "locations at which the oil drops from the internal combustion engine 10" mentioned here can be grasped in advance as locations at which the oil is likely to drop in consideration of the structure of each internal combustion engine to which the acoustic insulation structure is applied. It should be noted that locations of installation of the oil detection sheet 50 that meet this kind of requirement may not always be the bottom surface portion 40a and may be any other desired locations as long as the water-absorption member 42 is present.

Figure 6:
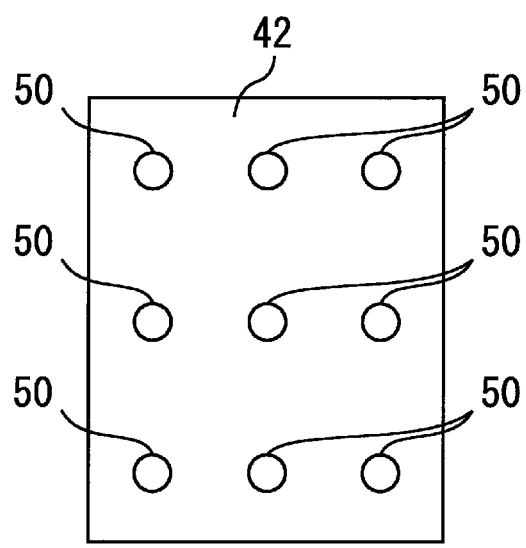
FIG. 6 is a view of a water-absorption member viewed from the direction of an arrow D in FIG. 5.

In an example shown in FIG. 6, an example of the number of the oil detection sheets 50 is nine and these oil detection sheets 50 are arranged dispersedly at a predetermined interval. Thus, the structure that is easy to exchange only a portion that has changed color can be achieved. Moreover, although each of the oil detection sheets 50 has, for example, a circle shape, the shape thereof is not particularly limited.

It should be noted that the oil detection sheets 50 may be, for example, embedded inside holes formed in the water-absorption member 42 in order to be able to easily exchange only an oil detection sheet 50 that has changed color, instead of the example in which they are attached to the surface of the water-absorption member 42 as described above. In addition, an oil detection sheet may alternatively be configured as a part of the water-absorption member, as long as it has a high water-absorbing performance.

2-2. Advantageous Effects Concerning Acoustic Insulation Structure with Oil Detection Sheet In an internal combustion engine which is covered by an acoustic insulation cover as with the internal combustion engine 10, there is a concern that, where water has entered into the inside of the acoustic insulation cover, a leaked oil from the internal combustion engine 10 may be mixed with the water and the visibility of the oil may decrease. Thus, there is a possibility that, even if a leaked oil from the internal combustion engine drops on the acoustic insulation cover, a mechanic may become difficult to notice the oil leakage.

In view of the issue described above, according to the acoustic insulation structure of the present embodiment, the oil detection sheets 50 are attached to the water-absorption member 42 at the locations at which the oil may drop from the internal combustion engine 10. According to the oil detection sheets 50, the mechanic can notice the attachment of a leaked oil separately from the water. Since, as a result, the detectability of the oil leakage can be improved, the oil leakage can be early discovered. In addition, other advantageous effects similar to those of the acoustic insulation structure according to the first embodiment can be achieved.

2-3. Modification Examples Concerning Second Embodiment

2-3-1. Example of Application of Acoustic Insulation Structure to Transmission FIG. 7 is a schematic diagram for describing an acoustic insulation structure for the power train that is applied to a transmission 60 combined with the internal combustion engine 10. The acoustic insulation structure according to the second embodiment that includes the oil detection sheets 50 may be applied not only to the internal combustion engine 10 but also to one or more other components of the power train (in this example, the transmission 60 combined with the internal combustion engine 10).

Figure 7:
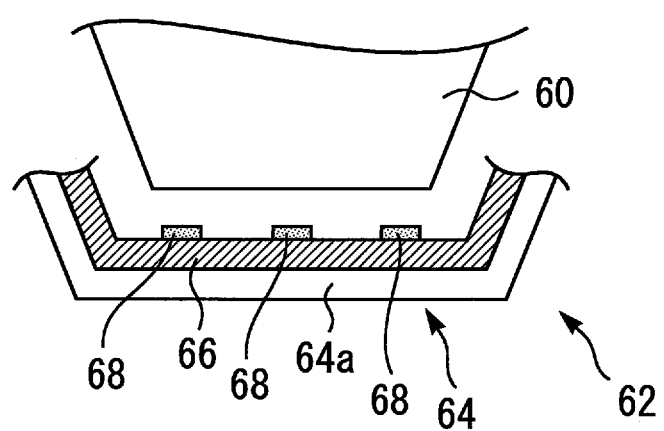
FIG. 7 is a schematic diagram for describing an acoustic insulation structure for the power train that is applied to a transmission combined with the internal combustion engine.

In detail, FIG. 7 shows a part of an acoustic insulation cover 62 that covers the lower portion (including the bottom portion) of the transmission 60. The acoustic insulation cover 62 includes a cover member 64 (including a moisture outlet which is not shown) having a similar configuration to that of the cover member 40 described above. The cover member 64 has a bottom surface portion 64a (i.e., pool portion) that is opposed to the bottom portion of the transmission 60. The acoustic insulation cover 62 further includes a water-absorption member 66 having a similar configuration to that of the water-absorption member 42 described above. Moreover, oil detection sheets 68 are attached to the water-absorption member 66 at locations at which oil (transmission oil) may drop from the transmission 60. The oil detection sheets 68 have a similar configuration to that of the oil detection sheets 50 described above.

According to the acoustic insulation structure shown in FIG. 7, where the transmission 60 is covered by the cover member 64, the detectability of the oil leakage from the transmission 60 can be improved as in the example of the engine oil according to the second embodiment. Thus, leakage of the transmission oil can be early discovered.

2-3-2. Example of Acoustic Insulation Structure with Fuel Detection Sheet

In the second embodiment described above, the acoustic insulation structure with the oil detection sheets 50 is exemplified. Another example of the acoustic insulation structure for a power train according to the present disclosure may include one or more fuel detection sheets (not shown) for detecting a leakage of the fuel supplied to the internal combustion engine 10 instead of or in addition to this kind of oil detection sheets 50. To be more specific, one or more fuel detection sheets are attached to the water-absorption member 42 at locations at which the fuel may drop from the internal combustion engine 10 (for example, fuel injection device 26) similarly to the example of the oil detection sheets 50. In addition, as this kind of fuel detection sheet, a known fuel test paper that changes color in response to attachment of fuel (for example, hydro carbon or gasoline) and does not change color even if it comes contact with moisture can be used.

2-3-3. Example of Acoustic Insulation Structure with Coolant Detection Sheet Still another example of the acoustic insulation structure for a power train according to the present disclosure may include one or more coolant detection sheets (not shown) for detecting a leakage of coolant that cools the internal combustion engine 10 instead of the oil detection sheets 50 and the fuel detection sheets that are described above or in addition to at least one of them. To be more specific, one or more coolant detection sheets are attached to the water-absorption member 42 at locations at which the coolant may drop from the internal combustion engine 10, similarly to the example of the oil detection sheets 50. In addition, as this kind of coolant detection sheet, a known coolant test paper that changes color in response to attachment of coolant and does not change color even if it comes contact with moisture can be used.

3. Other Embodiments

3-1. Another Example of Pool Portion and Water-Absorption Member

In the first and second embodiments, and the modification examples of the second embodiment described above, the cover members 40 and 64 whose bottom surface portions 40a and 64a associated with the bottom portion of the internal combustion engine 10 respectively correspond to the "pool portion" according to the present disclosure are exemplified. However, a location of installation of the "pool portion" at which the water that has been entered pools may not always be limited to the location opposed to the bottom portion of a component of the power train, such as an internal combustion engine, depending on the shape of the cover member. Thus, a water-absorption member may be arranged inside a cover member for any desired pool portion other than the bottom portion of this cover member. Also, the water-absorption member may extend to a designated moisture outlet.

3-2. Another Example of Power Train

The power train to which the acoustic insulation structure according to the present disclosure is applied is not limited to the examples of the power train including the internal combustion engine 10 and the transmission 60 described above, as long as it includes an internal combustion engine and at least internal combustion engine of the power train is covered by a cover member. That is to say, the preset acoustic insulation structure may alternatively be applied to, for example, a power train that includes an electric motor as well as the internal combustion engine as its power source of the vehicle. In addition, in this kind of power train, the electric motor as well as the internal combustion engine may be, for example, covered by cover members.

The embodiments and modification examples described above may be combined in other ways than those explicitly described above as required and may be modified in various ways without departing from the scope of the present disclosure.

What is claimed is:

1. Acoustic insulation structure for a power train, comprising:
    a cover member that covers at least an internal combustion engine of the power train including the internal combustion engine, and that includes a pool portion in which water that has entered into an inside of the cover member pools; and
    a water-absorption member arranged at the inside of the cover member,
    wherein the cover member includes a moisture outlet that releases, into an atmospheric air, moisture present inside the cover member, and
    wherein the water-absorption member extends to the moisture outlet from the pool portion.

2. The acoustic insulation structure for a power train according to claim 1,
    wherein the moisture outlet is arranged at a location opposed to a high-temperature portion of the internal combustion engine or a vehicle on which the power train is mounted.

3. The acoustic insulation structure for a power train according to claim 2,
    wherein the high-temperature portion is an exhaust system part of the internal combustion engine.

4. The acoustic insulation structure for a power train according to claim 2,
    wherein the high-temperature portion is a radiator through which coolant that cools the internal combustion engine flows.

5. The acoustic insulation structure for a power train according to claim 1,
    wherein the cover member covers a lower portion of the internal combustion engine including a bottom portion of the internal combustion engine, and
    wherein the pool portion is arranged at a location opposed to the bottom portion.

6. The acoustic insulation structure for a power train according to claim 1, further comprising an oil detection sheet that is attached to the water-absorption member at a location at which oil drops from the internal combustion engine, and that does not change color even if the oil detection sheet comes contact with moisture and changes color in response to attachment of the oil.

7. The acoustic insulation structure for a power train according to claim 1,
    wherein the power train includes a transmission combined with the internal combustion engine,
    wherein the cover member covers the transmission in addition to the internal combustion engine, and
    wherein the acoustic insulation structure further comprises an oil detection sheet that is attached to the water-absorption member at a location at which oil drops from the transmission, and that does not change color even if the oil detection sheet comes contact with moisture and changes color in response to attachment of the oil.

8. The acoustic insulation structure for a power train according to claim 1, further comprising a fuel detection sheet that is attached to the water-absorption member at a location at which fuel drops from the internal combustion engine, and that does not change color even if the oil detection sheet comes contact with moisture and changes color in response to attachment of the fuel.

9. The acoustic insulation structure for a power train according to claim 1, further comprising a coolant detection sheet that is attached to the water-absorption member at a location at which coolant that cools the internal combustion engine drops from the internal combustion engine, and that does not change color even if the oil detection sheet comes contact with moisture and changes color in response to attachment of the coolant.

* * * * *

UNITED STATES PATENT AND TRADEMARK OFFICE
CERTIFICATE OF CORRECTION

PATENT NO. : 11,299,110 B2  
APPLICATION NO. : 16/253625  
DATED : April 12, 2022  
INVENTOR(S) : Yoshiya Yamashita et al.

Page 1 of 1

It is certified that error appears in the above-identified patent and that said Letters Patent is hereby corrected as shown below:

On the Title Page

Please add Item (30) Foreign Application Priority Data:  
– March 8, 2018 (JP) ............................ 2018-042125 –

Signed and Sealed this  
Ninth Day of August, 2022

Katherine Kelly Vidal  
*Director of the United States Patent and Trademark Office*